United States Patent [19]

Kühn

[11] Patent Number: 4,590,980
[45] Date of Patent: May 27, 1986

[54] VARIABLE-WIDTH-BASE SOLID TIRE FOR ASSURING SEATED RIM MOUNTING ON VEHICLE WHEELS AND THE LIKE

[75] Inventor: Heinz Kühn, Waldeck, Fed. Rep. of Germany

[73] Assignee: Continental Gummi-Werke Aktiengesellschaft, Hanover, Fed. Rep. of Germany

[21] Appl. No.: 609,572

[22] Filed: May 11, 1984

[30] Foreign Application Priority Data

May 13, 1983 [DE] Fed. Rep. of Germany ....... 3317375

[51] Int. Cl.⁴ .......................... B60C 7/08; B60C 7/24
[52] U.S. Cl. .................. 152/323; 301/63 PW
[58] Field of Search .............................. 152/323, 325; 301/63 PW

[56] References Cited

FOREIGN PATENT DOCUMENTS

| 1019925 | 11/1957 | Fed. Rep. of Germany | 152/323 |
| 1926144 | 11/1970 | Fed. Rep. of Germany | 152/323 |
| 2014264 | 10/1971 | Fed. Rep. of Germany | 152/323 |
| 563673 | 1/1957 | Italy | 152/323 |

*Primary Examiner*—David A. Scherbel
*Attorney, Agent, or Firm*—Becker & Becker, Inc.

[57] ABSTRACT

A solid rubber tire for vehicle wheels is provided having a tenacious-hard tire base or bottom and also having the solid tire held between the rim flanges of the hub or wheel body. In order to be able to balance or equalize width tolerances of the tire foot or base and/or of the rim, the width of the tire foot or base is variable by one or more zones of reduced hardness, which preferably is attained by two or more zones of approximately equal cross sectional configuration or structure with reduced hardness, which zones are arranged distributed uniformly over the tire base or foot.

16 Claims, 4 Drawing Figures

VARIABLE-WIDTH-BASE SOLID TIRE FOR ASSURING SEATED RIM MOUNTING ON VEHICLE WHEELS AND THE LIKE

FIELD OF THE INVENTION

The present invention relates to a solid tire consisting essentially of rubber or rubber-like materials for vehicle wheels, friction wheels or pulleys or similar applications; the tire is arranged or mounted on a wheel body or hub engaging the tire also laterally thereof and the tire has a base or bottom of material with a composition adjusted or set tough or tenaciously hard, which base or bottom is harder than the running pad or cushion of the tire.

BACKGROUND OF THE INVENTION

Description of the Prior Art

Known tires of this construction, which generally or as a rule are mounted or installed upon rims or wheel bodies that are centrally divided or divided at the side, must be matched or adapted exactly to the pertaining rim both with respect to the inner diameter thereof as well as also with respect to the width of the base thereof. If such a dimensional relationship does not exist, thus the tire can loosen itself and can turn or rotate especially relative to the rim body. This leads to a premature or untimely wear.

SUMMARY OF THE INVENTION

An object of the present invention, in essence, is basically to construct the tire base or bottom of the aforementioned solid tire in such a manner that the tire also is mounted or installed in an orderly and methodical manner and can be correspondingly employed or used, when greater tolerances and diverging, deviating or imperfect structures or constructions exist in relation to the width of the rim or wheel body. Accordingly, the present invention is directed to a solid tire which can be employed not only on center-divided, but also on side-divided wheel-or rim bodies, without having to fear or be concerned therewith that a loosening of the tire body occurs and arises.

In order to solve and fulfill this object, according to the present invention, the width of the tire foot or base is variable or changed by one or more zones of reduced hardness. Accordingly, the tire base or foot in a known manner consists of rubber and the like in tenaciously hard contour or construction, although having zones, especially width sections or segments which via a reduced Shore hardness permit and allow an adaptation or matching to the inside diameter or width of the rim. With that it is advantageous, when the aforementioned zones with a foot or base hardness of more than 70 Shore preferably receive or maintain a hardness of approximately 55 to 65 Shore, while the width of these sections or segments in relation to the entire width of the tire foot or base preferably is to amount to approximately 50%, although also with predetermined types of tires deviations herefrom can be selected.

Furthermore, it is possible to incorporate tension-proof or tenacious inserts, for example steel wires, in order to increase the peripheral or circumferential strength of the tire. In connection with the mentioned zones of lower hardness, these strength or stress carriers can be so constructed that they enclose or surround the zones or reduced hardness, effectively or appropriately being adapted however such that via the presence or existence thereof there is not reduced the deformability of these zones or at least such deformability is not reduced to an extent worth mentioning.

This object, and other objects and advantages of the present invention, will appear more clearly from the following specification in connection with the accompanying drawings.

DESCRIPTION OF PREFERRED EMBODIMENTS

Figure 1:
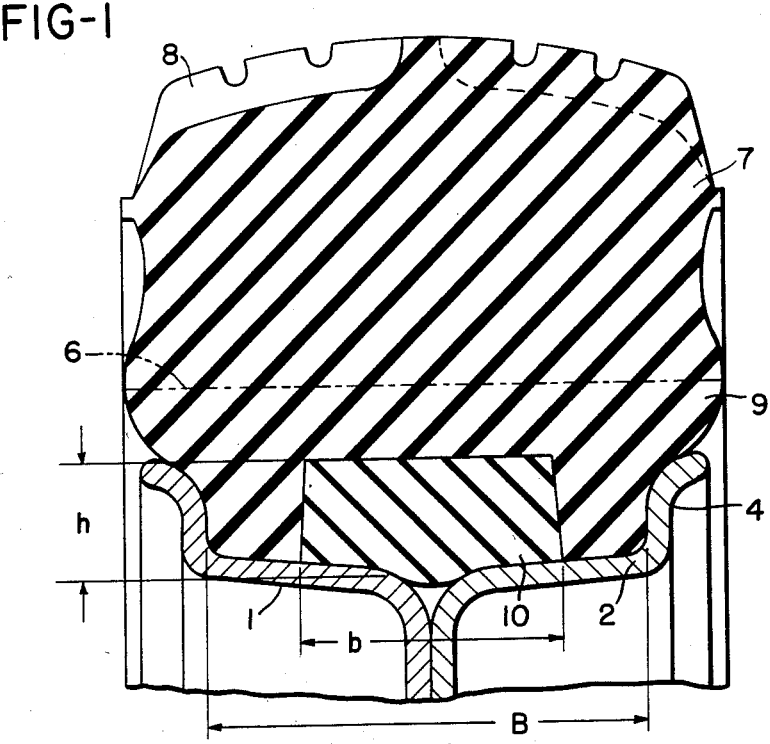
FIG. 1 shows a radial cross-sectional view through a vehicle wheel having a solid rubber tire mounted thereon.

Referring now to the drawings in detail, a center-divided rim is employed or utilized with all specific embodiments; the rim parts 1,2 are detachably or releaseably connected with each other by means not illustrated in further detail, generally by screws. The rim parts 1,2 along the outer periphery or circumference have a slightly conical seat or seating surface 3 and each having a horn or radial portion 4, of which the internal or inside surface 5 in the mounted or assembled condition determines the inside width B of the hub or wheel body.

This rim-or wheel body or hub serves for receiving and mounting of a solid tire consisting essentially of rubber, which tire externally or radially outwardly of the dash-dot line 6 has a running pad or cushion 7 with a tread or profiling 8. Along the inside periphery or circumference of the solid tire (limited at the outer circumference or periphery by the dot-dash line 6) there is located the tire base or bottom 9 which is constructed tenaceously hard by admixing of a foreign substance, foreign body or matter, for example in the form of ground fabric waste. The inside contour or shape of the tire base or foot 9 is thereby coordinated or adapted to the outer or external contour shape of the hub or wheel body. The surface 5 particularly engages a part of the side surface of the tire foot or base 9, when the solid tire is mounted or assembled or when the two rim parts 1,2 are drawn together.

According to FIG. 1, the tire base or foot 9 centrally has a rectangular zone 10 made of a rubber with a hardness of approximately 60 Shore, which hardness is considerably less or smaller compared with the hardness of the tire foot or base 9 (the foot or base hardness is greater than 70 Shore, preferably being in a range of approximately 80 to 90 Shore).

As a matter of course, there is to be understood that the zone 10 of less or lower hardness is vulcanized adhering or bonding in the tire foot or base 9. Moreover, the zone 10 has a width b which amounts to approximately 50% of the width B, while the height h of the zone 10 corresponds essentially to the height or level of the rim horns or wheel flanges 4, although, however, the height h also can extend as far as to the outer periphery or circumference, accordingly as far as to the dot-dash lines 6 of the tire base or foot 9.

Figure 2:
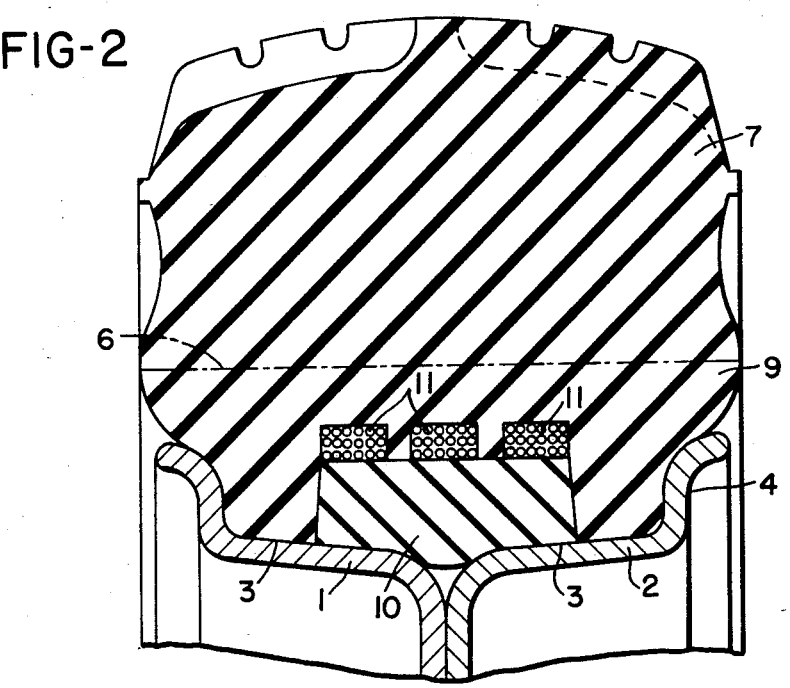
FIG. 2 illustrates a radial cross-sectional view of another embodiment through a vehicle wheel with a solid rubber tire mounted thereon.

With the specific embodiment according to FIG. 2, there is noted that the zone 10 is surrounded by three wire packets or bundles 11 which are arranged with spacing as to each other and which are in a position to take up considerable peripheral or circumferential forces in order thus to avoid a bulging of the zone 10 outwardly or respectively to guarantee and assure the seating of the tire, when the rim parts 1,2 are drawn together and with that the zone 10 is reduced in the axial distance thereof.

Such a width reduction of the tire base or foot 9 is possible because of or on the basis of the zone 10 and is always desired then when there are undersizes with rim-, hub- or wheel bodies or when irregular, varying or deviating rim outer contours or shapes are to be employed. The tire base or foot 9 accordingly is generally produced with a nominal oversize, at least however being adapted, matched or adjusted to the greatest or largest possible rim. All smaller rim-, hub- or wheel bodies then are employable, in that the aforementioned deformation of the zone 10 can be executed or accomplished.

Figure 3:
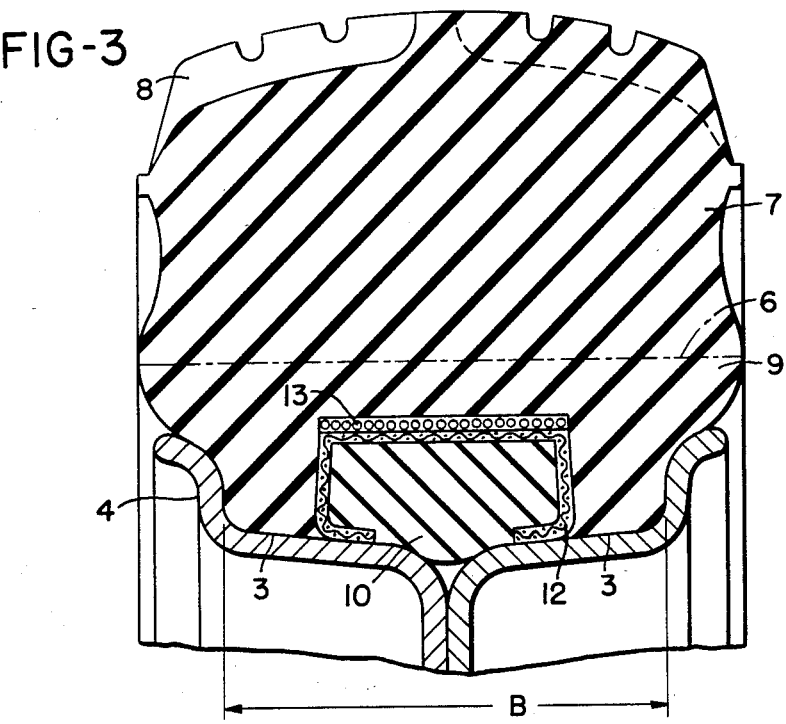
FIG. 3 shows a radial cross-sectional view through another vehicle wheel having a solid rubber tire mounted thereon.

With the specific embodiment according to FIG. 3, there is noted that the zone 10 is enclosed by a full or finished weave or fabric 12, which in turn is secured again at the outer circumference or periphery of the zone 10 by tension-proof ropes, strands, cables or lines 13, which extend approximately in tire circumferential or peripheral direction.

Figure 4:
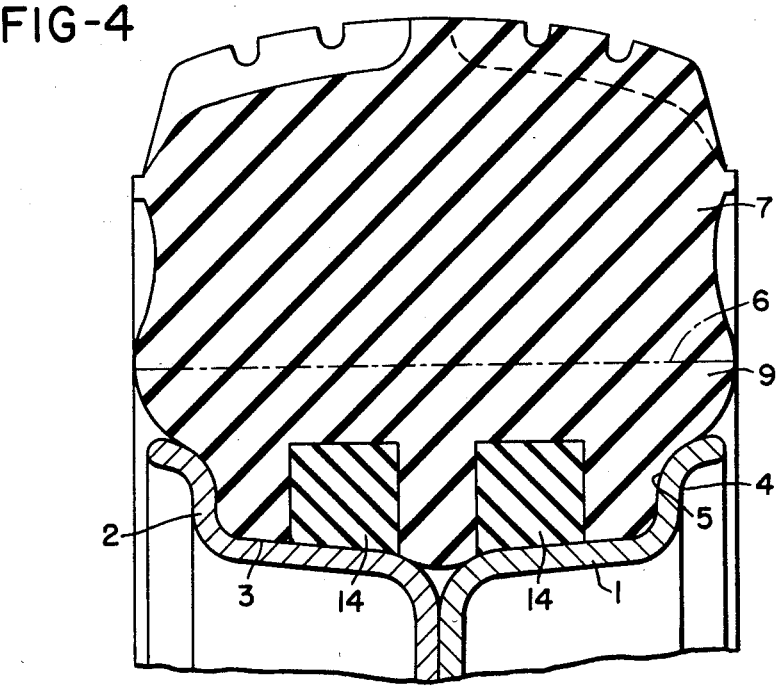
FIG. 4 shows still another embodiment according to the present invention for a vehicle wheel having a solid rubber tire mounted thereon illustrated in a radial cross-sectional view.

With the specific embodiment according to FIG. 4, the sum or total of the widths of the two employed zones 14 likewise is distributed over approximately 50% of the foot or base width of the tire, although the two zones 14 are approximately uniformly distributed over the width of the tire, accordingly being arranged with spacing as to each other as well as also with a spacing or distance from the surfaces 5.

There is also mentioned that because of the features of the present invention there also can be equalized tolerances in relation to the surface shape or contour and especially with respect to the outer diameter of the rim; differences in diameter with that are non-critical.

In summary, the present invention relates to solid tires for vehicle wheels and the like consisting essentially of rubber or rubber-like synthetic materials, which tire is mounted or arranged upon a hub or wheel body engaging the tire also laterally and having a tenacious-hard adjusted tire foot or base, of which the hardness is greater than the hardness of the running pad or cushion surrounding the tire foot or base, characterized thereby that the width of the tire foot or base 9 is variable, changeable or capable of being modified by one or more zones 10 of reduced hardness.

With a hardness of the tire foot or base with a Shore hardness greater than 70 Shore A, preferably however in the range of approximately 80 to 90 Shore A, then the Shore hardness A of the zones 10 amounts to a value correspondingly in a range of 40 to 70, preferably however in a range of 55 to 65 respectively.

The width of the zone or zones 10 amounts to a value in a range of 25% to 90% of the tire foot or base width, preferably however amounting to a value in a range of only approximately 50% of this width.

The zones 10 form parts of the inner peripheral or circumferential surface of the solid tire.

The zone or zones 10 are arranged between cross sectional sections or segments of tenacious hard construction in such a manner that the hub or wheel bodies 1,2 engage the tire body laterally at these tenaciously hard adjusted cross sections.

The height or level of the zones 10 corresponds essentially to half the height or level of the tire foot or base 10.

Two or more zones of approximately equal cross sectional configuration or construction are arranged distributed uniformly over the tire foot or base 9 according to FIG. 4.

The zones are surrounded at least about the outer periphery or circumference by tension-proof strength carriers 11, 13.

The strength carriers are arranged with spacing as to each other in such a manner that the strength carriers do not counter, or do not considerably counter an axial deformation of the zone 10.

The strength carriers extend at least substantially in tire circumferential or peripheral direction and can form bundles 11 arranged in spaced relationship from each other.

The strength carriers 12, for example of fabric or weave, are provided which cover the zone at the outer circumference or periphery and also laterally, as the case may be also having the strength carriers extend or covering also along parts of the inner periphery or circumference thereof.

A vehicle wheel with a solid tire is provided according to the present invention having features of one or more of the foregoing specific embodiments therewith.

The present invention is, of course, in no way restricted to the specific disclosure of the specification and drawings, but also encompasses any modifications within the scope of the appended claims.

What I claim is:

1. A solid tire having a running pad for vehicle wheels that includes a rim as well as a wheel body means, said tire being made essentially of rubber as well as rubber-like synthetic materials, such tire being mounted upon the rim of the wheel body means engaging the tire also laterally thereof and having a tenacious hard set tire base of which hardness is greater than hardness of the running pad surrounding the base of the tire, comprising: at least one zone of reduced hardness by which width of the tire base is variable in order to be able to equalize width tolerances of the tire base as well as the rim; said at least one zone of reduced hardness forming part of an inside peripheral surface of the solid tire to allow adaptation to diameter as well as width of the rim to avoid having the tire loosen itself so as to turn or rotate especially relative to the rim which would lead to premature and untimely wear; and tension-proof strength carriers that surround an outer periphery of said at least one zone of reduced hardness and that are positioned to take up considerable peripheral and circumferential forces in order to thus avoid a radially outward bulging of said zone of reduced hardness and to assure seating of the tire on the rim.

2. A tire according to claim 1, in which hardness of the tire base has a Shore hardness greater than 70 Shore A, and Shore hardness A of the at least one zone of reduced hardness is in a range of 40 to 70.

3. A tire according to claim 2, in which width of said at least one zone of reduced hardness amounts to only approximately 50% of tire base width.

4. A tire according to claim 2, in which Shore hardness of the tire base is in a range of 80 to 90 Shore A.

5. A tire according to claim 4, in which Shore hardness of the tire base is in a range of 80 to 90 Shore A and Shore hardness of the at least one zone of reduced hardness is in a range of 55 to 65.

6. A tire according to claim 2, in which Shore hardness of the at least one zone of reduced hardness is in a range of 55 to 65.

7. A tire according to claim 1, in which width of said at least one zone of reduced hardness amounts to a range of 25% to 90% of the tire base width.

8. A tire according to claim 1, in which said at least one zone of reduced hardness is arranged between cross sectional segments of tenacious hard structure in such a manner that the wheel body means engage the tire body laterally against said tenacious hard set cross sectional segments.

9. A tire according to claim 1, in which height of said at least one zone of reduced hardness corresponds to essentially half of height of the tire base.

10. A tire according to claim 1, in which at least two zones of reduced hardness of approximately equal cross sectional configuration are arranged distributed uniformly over the tire base.

11. A tire according to claim 1, in which said strength carriers are arranged with spacing relative to each other so as to avoid countering substantially any axial deformation of said at least one zone of reduced hardness.

12. A tire according to claim 11, in which said strength carriers extend at least substantially in tire peripheral direction and form bundles arranged spaced from each other.

13. A tire according to claim 12, in which said strength carriers cover outer periphery and also areas laterally of said at least one zone of reduced hardness.

14. A tire according to claim 13, in which said strength carriers are textile fabric.

15. A tire according to claim 13, in which said strength carriers also cover parts of inner periphery of said at least one zone of reduced hardness.

16. A tire according to claim 15, in which said strength carriers are woven textile fabric.

* * * * *